June 16, 1959 — R. D. ATCHLEY — 2,891,181

TORQUE MOTOR

Filed May 8, 1956 — 3 Sheets-Sheet 1

INVENTOR.
RAYMOND D. ATCHLEY
BY
ATTORNEY.

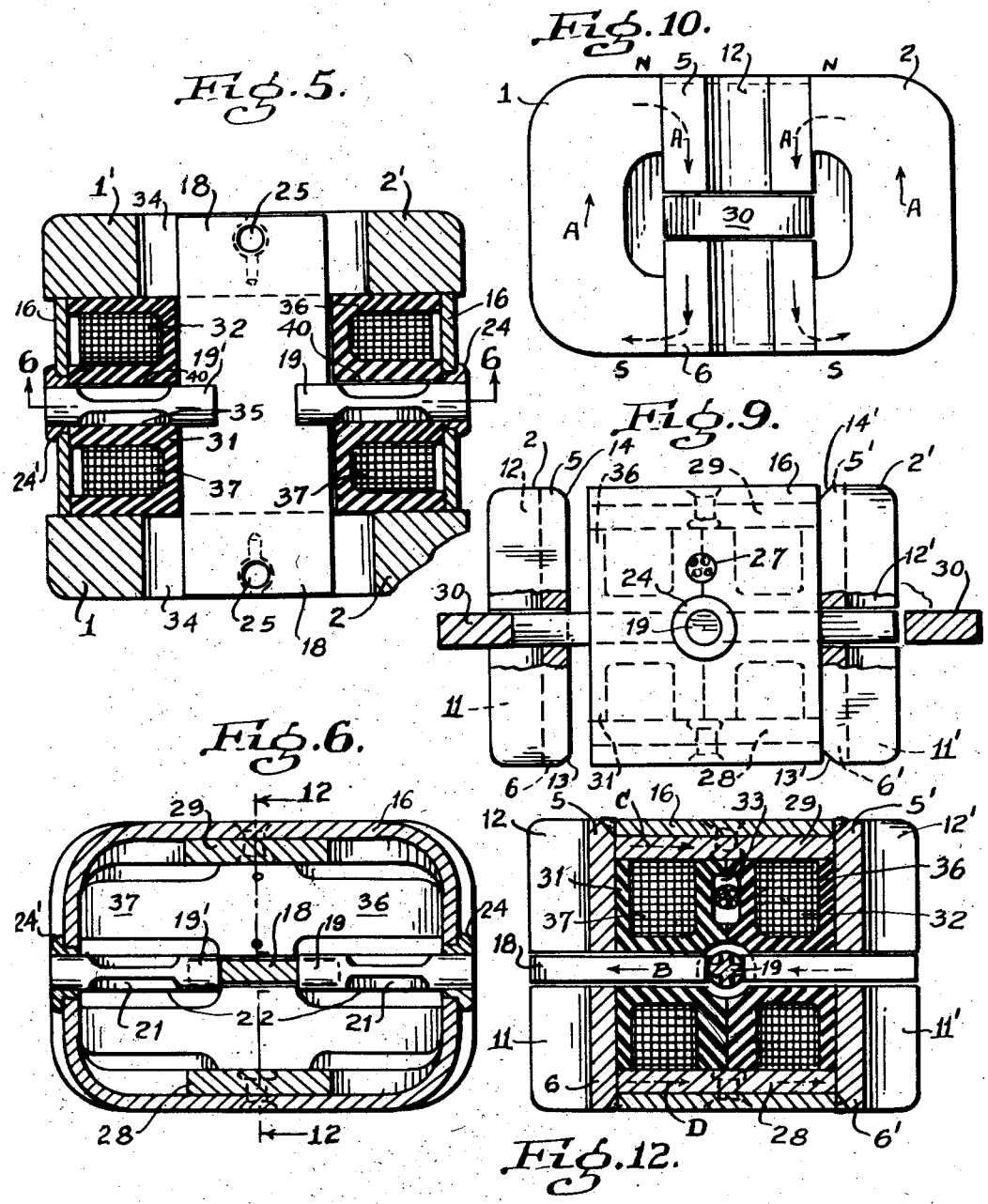

June 16, 1959  R. D. ATCHLEY  2,891,181
TORQUE MOTOR
Filed May 8, 1956  3 Sheets-Sheet 3
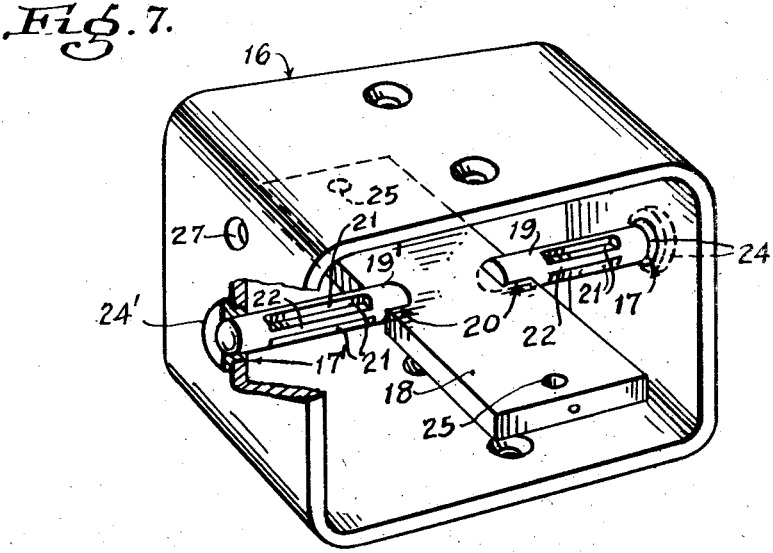
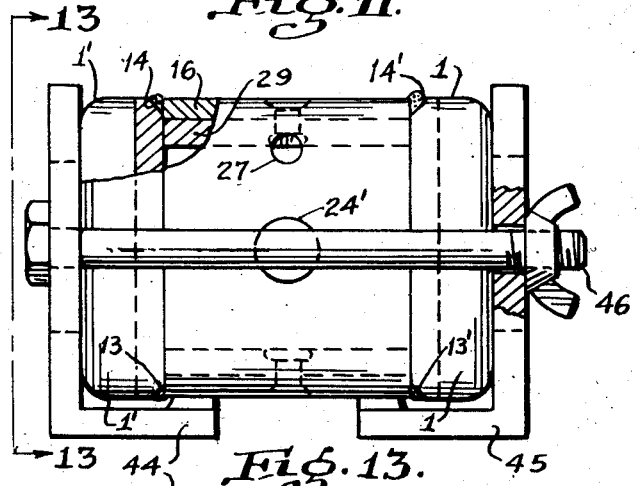
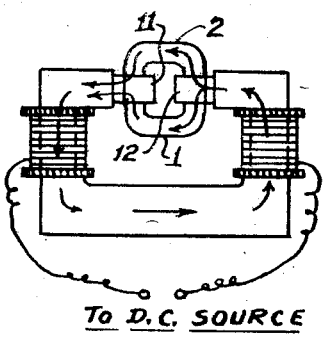
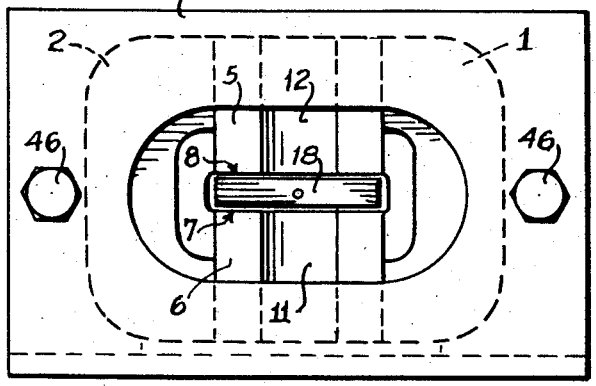
INVENTOR
RAYMOND D. ATCHLEY
BY
ATTORNEY

United States Patent Office 2,891,181
Patented June 16, 1959

2,891,181

TORQUE MOTOR

Raymond D. Atchley, Los Angeles, Calif., assignor to Raymond Atchley, Inc., Los Angeles, Calif., a corporation of California Application May 8, 1956, Serial No. 583,487

14 Claims. (Cl. 310—36)

Electromagnetic transducers are well known in which an angularly displaceable armature is positioned in a pair of spaced gaps, between pole faces, in push-pull relationship and with one end of the armature in one of the gaps and the other end of the armature in the other of said gaps, wherein the flux in the gaps, termed the polarizing flux, is created by a permanent magnet, and the flux is modified by a flux induced in the armature by means of control coils, said modifying flux being termed the control flux, whereby the armature is displaced angularly against a flexible torsional constraint in amount which is a substantially linear function of the net current passing through the control flux. Usually the control coils are wound in pairs to buck each other and when an unequal potential is impressed on the coils, a different current passes through the coils to generate the net current and the control flux. Such devices are quite old in the art and have been employed for many uses. In recent years, these devices have been used as an electromechanical transducer to produce a mechanical motion proportioned to an electrical current input, the displacement of the armature being used to actuate various mechanisms. Because the differential current causes a torque to be induced to rotate the armature, these devices have in more recent years been termed torque motors.

These devices have all had the following limitations:

The permanent magnets, which are most efficient are those made of alloys which are difficult to machine. They are thus usually cast and oriented. Such materials are the Alnico magnets, which are sold by Indiana Steel Products Co. and other companies. These magnets have in the past been connected to the low reluctance, high permeability pole pieces by means of studs, screws and dowels, requiring the casting of the magnets with suitable cores so that dowels and bushings could be placed in the magnets to receive the fastening means to connect the magnets to the pole pieces. But the removal of the material from the cores of the permanent magnet reduces the efficiency of the permanent magnet, defined as the polarizing flux per unit weight of the magnet, since it introduces a barrier of high reluctance in the magnetic path within the permanent magnet. Additionally, since the core reduces the cross-sectional area of the permanent magnet at the core, the magnetization of the magnet must be reduced to avoid magnetic saturation, since the linearity of the displacement of the armature as a function of control flux requires a linear relationship between the net reluctance in the magnetic circuit to the flux through the gaps. Consequently, such devices must be magnetized to a relatively low value of the polarizing flux, and thus the force output of the devices are restricted, or the devices tend to become bulky.

A second difficulty with the designs of the prior art is that the gap dimensions are critical and must be closely maintained and made uniform. Since the spacing of the gaps depends on the precision of machining of the pole faces and the precision of placing of the connection between the pole pieces and the magnets and the grinding of the magnet faces where they abut the pole pieces, the gap dimensions become uncertain to this extent as the permissible tolerances accumulate in construction. Since the gap spacing in the two gaps is thus made uncertain, it is only an accident that they come out exactly equal.

Unless the gaps are identical and the armature exactly centered, an angular displacement of the armature results when polarizing flux is applied, even though the control flux is zero. Since the gaps cannot be exactly the same as described above, and the exact centering of the armature is not feasible due to inability to exactly measure the gaps, and one must rely on original design and construction without the possibility of adjustment after assembly, this results usually in an initial displacement of the armature from zero position on assembly. Thus the units must first be assembled and tested and disassembled and corrected repeatedly until an approximation of the desired result is obtained.

A third difficulty comes from the fact that it is difficult to design and build the device so that the torsional constraint has exactly the stiffness which is required to cause the armature to deflect through the fraction of the gap spacing which is necessary for the desired performance. Since the degree of deflection for any given differential current is proportional to the mechanical stiffness of the constraint, it could not be determined until the device was completely assembled whether the device had the required mechanical spring constant, i. e., torsional rigidity required. This is aggravated when one uses a mounting in which the armature is connected to a shaft on which it is to rotate and a section of the shaft is milled to give a flexure of cruciform cross section. In such cruciform shaft the stiffness varies as the cube of the web of the cruciform section.

In such construction, even in close tolerance milling of the cruciform shaft, the variations obtained are many times greater than is desirable for a satisfactory transducer of this nature. It had to be corrected by a series of trials and errors, and the required rigidity could at last be approximated.

In fastening the armature to the shaft, pins were employed, and due to tolerances a lost motion is obtained between the shaft and armature, and this adds to the mechanical hysteresis.

The method of terminating the shaft in the prior art was by taper pins, keys and wedges. These permitted creep and axial rotation of the end of the shaft and introduced another mechanical hysteresis into the system.

It was always necessary to charge the structure magnetically after assembly, and this required substantial magneto motive force to pass through the permanent magnets, which is bypassed by the armature and pole pieces.

In the prior art the pole pieces carry the polarizing flux and the control flux, and they must be made large enough to carry these fluxes without saturation, and this adds to the weight.

It is an object of my invention to design a torque motor of the above general type which avoids in substantial degree or entirely the limitations of the designs of the prior art, and which will have a superior performance, efficiency and reduced size and weight for like force output, and will be cheaper to construct.

It is another object of my invention to so mount the pole pieces and the magnets without the use of fasteners imbedded or included within the magnets and thus avoid the incident reduction in the cross-sectional area of the magnet material. I have discovered that I may by modifying the surface characteristics of the face of the magnet where it joins the pole pieces to permit the brazing of the pole pieces and the magnets, and thus avoid the use of mechanical fasteners. I have discovered that by nickel plating the face of the magnet I may form a brazed or solder bond without introducing any substantial or significant reluctance into the magnetic path.

It is another object of my invention to make each gap a separate subassembly in such manner that these subassemblies may be assembled after grinding and machining and the gaps accurately adjusted and clamped in exact relationship so that they may be brazed or soldered. All subassemblies, each composed of a pair of pole pieces bridged by a permanent magnet, can have identical gaps. Two such subassemblies are used with a connecting bridge to establish the two spaced gaps in the motor.

The above construction also results in placing the permanent magnets so that they are closely adjacent to the pole faces. I may also direct the control flux to flow from a gap in one assembly to the gap in the other assembly through a bridge which may be much less in cross-sectional area than the cross-sectional area of the pole faces or of the permanent magnets. This reduces the ratio of the total weight of the low permeability ferromagnetic material, i.e., other than the permanent magnet material, to the weight of the permanent magnets in the magnetic circuit, and thus reduces the weight of the device per unit of force output of the device.

Another object of the device is to mount the armature on its cruciform shaft so that the shafts terminate rigidly in the armature and also rigidly at the other end in a separate non-magnetic supporting frame or armature cage. The frame is open at either end through which the armature ends protrude. This reduces the mechanical hysteresis of the device to a minimum. By making this mounting as a subassembly, the armature may be tested prior to assembly. The armature may be deflected by a known force, for example, a weight, and the deflection measured before assembly of the entire device. This determines the mechanical spring constant of the armature mounting. In the event the ratio is not that desired, the webs of the cruciform section may be ground so as to adjust the stiffness while it is supported in the subassembly, which acts as its own test fixture.

The field coils of the motor may then be placed in the armature subassembly about the armature for inductive coupling with said armature.

The two magnet subassemblies and the armature subassembly may then be assembled and clamped together and the magnet subassemblies adjusted in relation to the armature subassembly to accurately center the armature in each gap.

The magnet subassemblies may be charged prior to assembly or subsequent to assembly and the device may be tested in clamped condition to determine if the performance is that desired. If it is, then the armature cage is welded to the pole pieces and the entire device is thus made a rigid structure.

The invention will be further described in connection with the drawings, in which:

Fig. 5 is a section on line 5—5 of Fig. 3 with parts in plan, showing the armature and shaft in plan view.

Fig. 6 is a section on line 6—6 of Fig. 5 with parts shown in elevation.

Fig. 7 is a perspective view of the armature and cage subassembly shown in assembled position in Figs. 1 to 5, inc.

Fig. 8 is a schematic illustration of one means of charging the magnetic subassembly shown in Fig. 4.

Fig. 9 is a view partly schematic showing a method of assembly of the structure.

Fig. 10 shows a plan view of the subassembly shown in Fig. 4 with the keeper in postion.

Fig. 11 shows one means of adjusting the parts of the structure prior to final assembly and also to be used for testing prior to assembly.

Fig. 12 is an irregular section on line 12—12 of Fig. 6.

Fig. 13 is a view taken on line 13—13 of Fig. 11.

Figure 1:
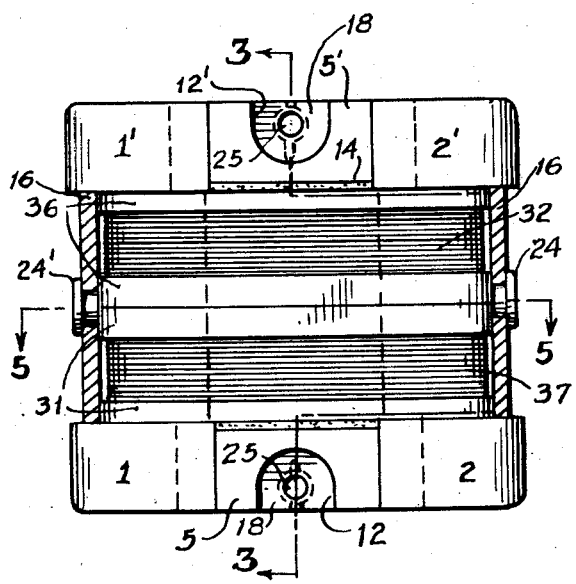
Fig. 1 is a plan view partly in section of the assembled torque motor.
Figure 2:
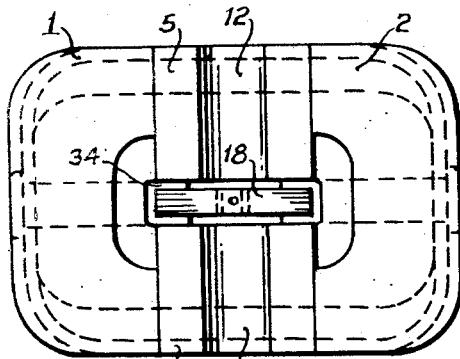
Fig. 2 is an end view of Fig. 1.

In the above figures 1, 2, 1' and 2' are permanent magnets of magnetic material of high retentivity, such as for example, Alnico, previously referred to. They are connected in a manner to be further described to pole pieces 5 and 6, and 5' and 6'. The pole pieces are formed as indicated of blocks of material having a width substantially equal to the width of the permanent magnets, and having a height sufficient to establish the gaps between the faces 7 and 8, and may be recessed at 11 and 12, for purposes to be discussed below. The faces of the magnets 1 and 2 and faces 9 and 10 may be made coplanar, although they need not be so, particularly if the faces 9 and 10 and the opposite faces of the pole piece are separated more widely than the thickness of the magnet so that substantially no portion of the magnet overlaps the faces. The abutting faces 15a, 15b, 15c and 15d of the magnet and the pole pieces are preferably ground flat and make flush fits for reasons to be more fully described hereinbelow.

The material of which the pole faces are made are those conventionally used for magnet pole faces, to wit: those having a high permeability and low retentivity. Suitable alloy to be used is "Hypernik" manufactured by Westinghouse Electric Coropration, as is conventional for such constructions.

I have found that by grinding the faces of the magnet and then electroplating them with a thin film of nickel, I may connect the pole pieces to the permanent magnets by brazing or soldering. Thus, I may clamp the pole pieces and the magnets in the form shown in Fig. 4 and adjust the vertical and horizontal orientation of the pole faces to produce parallelism between the surfaces 7 and 8 and the degree of spacing desired, and having so adjusted the pole pieces, and while holding the structure in clamped position the pole parts can be brazed or soldered into one solid structure. Since I employ two such subassemblies in the torque motor designed, and each of them are of identical construction, they may each be formed from identical pieces and individually adjusted to produce subassemblies which I may stock to use at any time.

Figure 3:
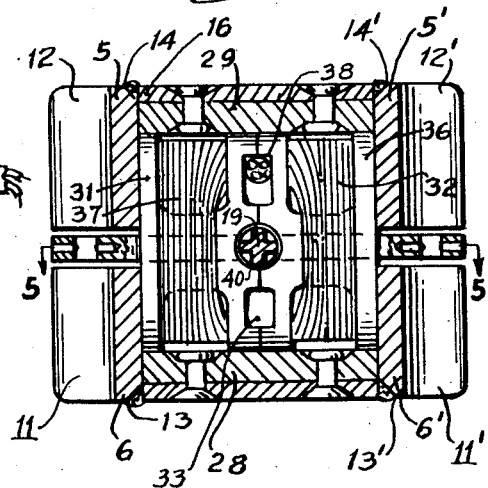
Fig. 3 is an irregular sectional view on line 3—3 of Fig. 1.

I also produce a further subassembly shown in Fig. 7. This subassembly is the frame and armature and its shaft mounting. The rectangular tube 16 acts as a frame to support the armature. It may be made by stretching a circular tube which is faced at its ends and is of a dimension relative to the other parts as shown in Figs. 1, 2 and 3. It is bored at 17 and 17' to a diameter greater than the diameter of the shaft 19, to be further described. The armature 18 which is in the form of a flat bar carrying a tapped hole 25 at each end has slots 20 into which the ends of the shafts 19 and 19' are fitted. The shafts 19 and 19' have a cruciform section formed by milling four slots 21 at 90° to each other to form four webs 22 standing at 90° to each other.

The shaft is positioned by entering one end, for example, the end 19' through 17', and then entering the shaft through the opposite bore 17, the bores being sufficiently enlarged for this purpose. A bushing 24 and 24' is then slipped over the end of the shaft to fill in the space between the shaft and the bore hole, and the shaft and the bushing is brazed into position. This produces a rigid connection between the end of the shaft and the frame 16 and a rigid connection between the armature 18 and the shafts 19 and 19'.

The assembly shown in Fig. 7 may be mounted in a suitable vise or fixture, and by hanging a weight on 25 the deflection of the armature on the shaft 19, which because of its cruciform structure is a torsional flexure, may be determined. Should the structure be too stiff, in other words, should the deflection be less than that desired for the force applied, the webs may be touched up with a hand grinder to reduce their section and thus decrease their stiffness, until the desired degree of angular displacement is obtained for the applied force. Since both ends are open and the shaft is accessible, the adjustment of the stiffness of the flexure may thus be obtained easily.

The thickness of the armature is made to bear such relationship to the spacing of the pole pieces 5 and 6 so that when the armature is positioned midway between these pole pieces the gap of desired magnitude is obtained. Since the gap dimensions may be accurately controlled to any degree of tolerance permitted by the accuracy of measurement, and since the thickness of the armature may be controlled within the limits of low tolerance, grinding or other surfacing, and the positioning of the armature may be made within the accuracy permitted by measurement methods, the armature may be centered in the gaps to give four gaps of equal length within a very high degree of accuracy. The width of the armature is made substantially equal to the width of the pole pieces 5 and 6. The length of the armature is preferably made to be equal to the spacing of the outer faces of the pole pieces 5 and 6 and the corresponding pole pieces 5' and 6'. This length is convenient but it is not essential, and in so using an armature of this length the pole pieces are recessed at 11 and 12, and 11' and 12' in order to permit a rod to be bored into the bore 25. The armature may thus be made shorter, or longer than the spacing between the outer face of the pole pieces, as is desired. The stroke thus may be adjusted either by increasing the length of the tubes 16 and also the length of the armature, or by increasing the length of the armature itself, and may be decreased by reducing the length of the tube 16 and the length of the armature without modifying the magnet subassemblies.

Before assembling the structure a bar of material similar to the material used for the pole pieces and equal to the length of 16 and of width equal to the width of the pole peices 5 and 6 is mounted under the top and on the bottom face of the tubes 16, as is shown at 28 and 29 in Figs. 3, 6 and 12 to act as bridge members connecting the pole pieces of both magnet subassemblies. These bars may be made half the thickness of the thickness of the armature material if desired, but may be any greater thickness. Conveniently, the thickness of these materials is held to as low a dimension as possible, to wit, about one-half the thickness of the bar of the armature in order to reduce the weight of the material in the magnetic path other than the permanent magnet. However, for convenience of manufacture, the thickness of the bars 28 and 29 may be made equal to that of the armature, so that it may be cut from the same stock from which the armature is cut, thus reducing the cost and the complexity of assembly. Since the bridge members in either case are both of thickness less than the pole pieces they connect, the advantage of weight reduction is obtained over that which would be necessary if these bridge members were part of the pole pieces at the several gaps.

Coil forms 31 and 36 on which are wound coils 32 and 37 are slipped over each end of the armature. The coil forms are so formed that a slot 34 is provided to permit the armature to deflect and a recess 35 and 40 is provided to permit the coil forms to fit around the shaft. The coil forms also have recesses 33 and 38 to permit the passage of the terminal wires which exit through bore 27 in the tube 16 for connection to suitable terminals. These coils are connected as bucking coils, as is conventional for torque motors of this general type. The coil forms are so dimensioned that they abut against the faces of the pole pieces and against the return bars 28 and 29 and are thus held clamped firmly in position.

Figure 4:
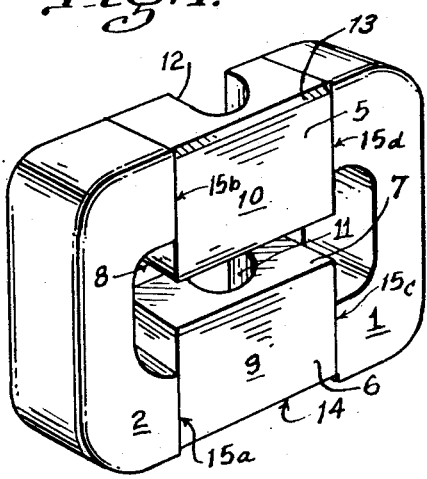
Fig. 4 is a perspective view of the magnet and pole piece subassembly, as shown in Figs. 1 to 3.

The magnet subassembly shown in Fig. 4 is then connected, as will be more fully described below, by welding at the champfers 13 and 14 to the tube 16. It will be observed that when this is done that a rigid construction is made with the bars 28 and 29 abutting in flush contact with the faces 9 and 10 of the pole pieces, which are rigidly connected to the magnets 1 and 2 by brazing. Thus, a perfectly rigid construction is formed in which the only movable part is the armature bar 18 upon its flexure. No displacement of any part of the magnets, pole pieces, bridge bars 28 and 29, or of the ends of the shaft 19, either where they connect to the armature or to the tube 16 is possible.

The aforesaid construction makes possible the method of assembly and the advantages as will be more fully described below, and produces the advantages and results which will be now also described.

The assembly shown in Fig. 4 may be magnetized to the desired flux density, either after assembly in the torque motor or prior to assembly. I prefer to do it prior to assembly. If charged after assembly with the armature in position, the reluctance in the gap is reduced by the presence of the armature, whereas if the subassembly is charged prior to assembly with a completely open gap between the pole faces, the magneto motive force necessary to magnetize the magnets 1 and 2 is much reduced, as much as to a third of the magneto force which would be necessary if the armature had been in position. This arises from the fact that with the high reluctance in the gap between the pole faces, the flux passes largely through the permanent magnets, whereas with a relatively low reluctance material, such as when the armature is introduced in the gap, more of the flux passes through the gap than the armature. The subassemblies prior to assembly may be charged by placing them in a charging magnet, as shown in Fig. 8. When the desired flux has passed through the subassembly, the current may be cut off and since the circuit is complete, as shown in Fig. 8, and the assembly while in position in the charging magnet is protected against stray fields. Before removing the magnet subassembly from position in the charging magnet, a keeper, to wit, a bar which just fits in between the pole faces, and which is equal to the length of the pole faces, is introduced as is shown in Fig. 9. The keeper is shown at 30. The keeper should be retained in position to protect against accidental contact with ferromagnetic material which might otherwise impair the utility of the subassembly. It should also be kept in position until fully assembled, as will be further described.

The assembly is made by using the armature which has been mounted in the subassembly shown in Fig. 7, as previously described, to displace the keeper 30, as is shown in Fig. 9. This is conveniently done by constructing a suitable jig fixture, such as shown in Figs. 11 and 13. It will be observed that by this procedure the magnets and the pole pieces never see a reluctance greater than the reluctance which they will experience after assembly.

Orientation of the poles is such that the two north poles are on one side of the magnet of the armature, and the two south poles are on the other side of the armature. The opposite ends of the bridge bar 29 in contact with the two north poles are at equal magnetic potential, and the two ends of the bar 28 in contact with the pole faces 6 and 6' are at equal magnetic potential. Tube 16, being of material of very high reluctance, carries substantially no flux.

Referring now to the construction as previously described, it will be observed that the permanent magnets 1, 2, 1' and 2' are of uniform cross-section and contain no cores or bores, which reduces the cross-section. This is due to the fact that the assembly is made by brazing or soldering them to the pole pieces, and the pole pieces are connected to the framework 16 by welding. The polarizing flux passes in the direction shown by the arrows A from the magnets through the pole pieces, and through the armature gaps and the armature. All gaps are equal and the armature is centrally positioned, as was described, by the techniques previously described.

The control flux which is generated by a differential current passing through the coils 32 and 37 generates a flux, which, for example, is illustrated by the arrows B, through the armature. The control flux adds to or subtracts from the flux passing from the permanent magnets as will be clear to those skilled in the art, and circulates through the return path 28 and 29, as indicated by the arrows D and C in Fig. 12. It will be observed that the control flux circuit is independent of the polarizing flux circuit except at the gaps. Since the bridging return path bars 28 and 29 each carry one-half of the control flux passing through the armature 18, they need be only one-half of the armature thickness, and since the cage 16 is only used as a structural member and not part of the magnetic path, it can be made quite thin, depending only on its structural characteristics. An enlarged space is provided about the armature to permit a large number of turns of wire to be used. This produces a higher ratio of copper to magnetic material, which produces desirable resutls in increasing the efficiency of the structure, and increases the magnitude of the control flux in ratio to the polarizing flux. Additionally, it will be observed that restricting the ratio of the weight and volume of the high permeability material in the magnetic circuit to the weight and volume of permanent magnet, a greater efficiency is obtained, since a greater ratio of the weight is in the form of permanent magnet. This is made possible by restricting the pole pieces substantially to the volume necessary to establish the gaps and to produce the desired flux density across the gap and using a much thinner material to provide the return path for the control flux. This is illustrated by the use of the bars 28 and 29 to carry the return path for the control flux.

The advantages of this construction are as follows: (1) the polarizing magnetic circuit is made of two substantially identical separate subassemblies, (2) the magnetization can be effected with a lower magneto motive force, (3) a subassembly consisting of an open ended armature support in which the armature is mounted on a torsional flexure such that the mechanical spring constant can be adjusted with relationship to the flux density in the permanent magnet circuit before assembly and can be adjusted if too stiff before assembly, (4) the gap between the pole pieces can be made uniform and reproducible, and the armature may be centered prior to permanent assembly, and the torque motor tested prior to final assembly, (5) the several subassemblies may be connected, adjusted and tested prior to final assembly, (6) the parts may be rigidly assembled without mechanical fasteners, (7) the return path for the control flux is laregly separate from the circuit for the polarizing flux except where they both pass through the gaps, (8) the ratio of the ferromagnetic material other than the permanent magnet in the magnetic path to the permanent magnet material can be made low by restricting the volume of the return path for the control flux, (9) this provides for an increased volume available to permit an increased number of turns of copper wire to be used in the differential coils and thus increases the efficience of the unit, and (10) the only movable part is the armature which is mounted on a torsional flexure with no mechanical hysteresis.

While I have described a particular embodiment of my invention for the purpose of illustration, it should be understood that various modifications and adaptations thereof may be made within the spirit of the invention as set forth in the appended claims.

I claim:

1. A torque motor comprising a pair of spaced polarizing magnet assemblies, each assembly composed of a pair of permanent magnets, said magnets being fastened at their north poles to a pole piece and at their south poles to a second pole piece, said pole pieces being spaced to form a gap completing a magnetic circuit through the pole pieces and each of said permanent magnets in each of said assemblies, an armature, said armature extending into the gap in each of said magnet assemblies, a mounting for said armature, said mounting comprising a support positioned between said magnet assemblies and fastened to each of said assemblies, and a flexure fixedly connected to said armature and said support for angular motion of said armature in said gaps, and a field coil positioned adjacent said armature in inductive relationship to said armature.

2. A torque motor comprising a pair of spaced polarizing magnet assemblies, each assembly composed of a pair of permanent magnets, said magnets being fastened by soldering at their north poles to a pole piece and at their south poles to a second pole piece, said pole pieces being spaced to form a gap completing a magnetic circuit through the pole pieces and each of said permanent magnets in each of said assemblies, an armature, said armature extending into the gap in each of said magnet assemblies, a mounting for said armature, said mounting comprising a support positioned between said magnet assemblies and fastened to each of said assemblies, and a flexure fixedly connected to said armature and said support for angular motion of said armature in said gaps, and a field coil positioned adjacent said armature in inductive relationship to said armature.

3. A torque motor comprising a pair of spaced polarizing magnet assemblies, one at each end of said motor, each assembly composed of a pair of permanent magnets, said magnets being fastened at their north poles to a pole piece and at their south poles to a second pole piece, said pole pieces being spaced to form a gap completing a magnetic circuit through the pole pieces and each of said permanent magnets in each assembly, an armature, said armature extending into the gap in each of said magnet assemblies, an open ended armature support frame connected to said assemblies, a shaft extending perpendicularly from said armature and fixedly connected to said armature support frame and said armature for angular displacement of said armature in said gaps, a torsional flexure in said shaft, and a field coil positioned in said frame inductively coupled with said armature.

4. A torque motor comprising a pair of spaced polarizing magnet assemblies, each assembly composed of a pair of permanent magnets, said magnets being fastened by soldering at their north poles to a pole piece and at their south poles to a second pole piece, said pole pieces being spaced to form a gap completing a magnetic circuit through the pole pieces and each of said permanent magnets in each assembly, an armature, said armature extending into the gap in each of said magnet assemblies, an open ended armature support frame connected to said assemblies, a shaft extending perpendicularly from said armature and fixedly connected to said armature support frame and said armature for angular displacement of said armature in said gaps, a torsional flexure in said shaft, and a field coil positioned in said frame inductively coupled with said armature.

5. A torque motor comprising a pair of spaced polarizing magnet assemblies, each assembly composed of a pair of permanent magnets, said magnets being fastened at their north poles to a pole piece and at their south poles to a second pole piece, said pole pieces being spaced to form a gap completing a magnetic circuit through the pole pieces and each of said permanent magnets in each assembly, an armature, said armature extending into the gap in each of said magnet assemblies, an open ended armature support frame, a shaft extending perpendicularly from said armature and fixedly connected to said armature and said armature support for angular displacement of said armature in said gaps, a cruciform section in said shaft permitting torsional flexure, and a field coil positioned in said frame inductively coupled with said armature, said frame connected to said assemblies by a weld joint between said frame and said pole pieces.

6. A torque motor comprising a pair of spaced polarizing magnet assemblies, each assembly composed of a pair of permanent magnets, said magnets being fastened by soldering at their north poles to a pole piece and at their south poles to a second pole piece, said pole pieces being spaced to form a gap completing a magnetic circuit through the pole pieces and each of said permanent magnets in each assembly, an armature, said armature extending into the gap in each of said magnet assemblies, an open ended armature support frame, a shaft extending perpendicularly from said armature and fixedly connected to said armature and said support for angular displacement of said armature in said gaps, a cruciform section in said shaft and permitting torsional flexure, and a field coil positioned in said frame inductively coupled with said armature, said frame connected to said assemblies by a weld joint between said frame and said pole pieces.

7. A torque motor comprising a tubular frame, a shaft positioned in said frame, each end of said shaft fixedly connected to said tubular frame, an armature fixedly connected to said shaft, a torsional flexure in said shaft, a pair of polarizing magnet assemblies, one at each end of said tubular frame, said assemblies composed of permanent magnets, and each assembly containing a pair of spaced pole pieces, one of said pole pieces in each said assembly being connected to a south magnetic pole and the other of said pole pieces of each said assembly being connected to a north magnetic pole, said pole pieces in each assembly being spaced to form a gap in each assembly, said armature extending in said frame with one end of said armature in one of said gaps and the other end of the armature in the other of said gaps, and a field coil in said frame in inductive relationship with said armature.

8. A torque motor comprising a tubular frame, a shaft positioned in said frame, each end of said shaft fixedly connected to said tubular frame, an armature fixedly connected to said shaft, a torsional flexure in said shaft, a pair of polarizing magnet assemblies, one at each end of said tubular frame, said assemblies composed of a pair of permanent magnets and each assembly containing a pair of spaced pole pieces, one of said pole pieces in each said assembly being connected to a south magnetic pole of one of said magnets of said pair, and the other of said pole pieces of each said assembly being connected to a north magnetic pole of the other of said magnets of said pair, said pole pieces in each assembly being spaced to form a gap in each assembly, said armature extending in said frame with one end of said armature in one of said gaps and the other end of the armature in the other of said gaps, and a field coil in said frame in inductive relationship with said armature.

9. A torque motor comprising an open ended armature support frame, an armature in said frame, a shaft fixedly connected to said armature and to said frame, a torsional flexure in said shaft, permitting said armature to move angularly with respect to said shaft, a magnet assembly mounted one at each end of said armature frame, said assembly comprising permanent magnets and pole pieces, one of the pole pieces in each assembly being connected to a north magnetic pole, and another of the pole pieces in each assembly being connected to a south magnetic pole, said pole pieces in each assembly being spaced to form a gap, one end of said armature being positioned in one of said gaps, and the other end of said armature being positioned in the other of said gaps, and a field coil in said frame inductively coupled with said armature.

10. A torque motor comprising an open ended armature support frame, an armature in said frame, a shaft fixedly connected to said armature and to said frame, a torsional flexure in said shaft, permitting said armature to move angularly with respect to said shaft, a magnet assembly mounted one at each end of said armature frame, said assembly comprising a pair of permanent magnets and a pair of pole pieces, one of the pole pieces in each assembly being connected to a north magnetic pole of each of said magnets of said pair, and another of the pole pieces in each assembly being connected to a south magnetic pole of each said magnet of said pair, said pole pieces in each assembly being spaced to form a gap, one end of said armature being positioned in one of said gaps, and the other end of said armature being positioned in the other of said gaps, and a field coil in said frame inductively coupled with said armature.

11. A torque motor comprising four permanent magnets, each of said permanent magnets being magnetically connected at their north poles to pole members, and each at their south poles to pole members, said pole members being mounted and spaced from each other to form a pair of gaps, a frame having opposite sides, an armature having opposite faces positioned along said sides of said frame and extending exteriorly of the ends of said frame and into and between said gaps and one end of said armature positioned in one of said gaps and the other end of said armature positioned in the other of said gaps, means for mounting said armature in said frame and in said gaps for angular displacement of said armature in said gaps, said mounting including a torsional flexure constraint creating a positive angular restoring force on such angular displacement of said armature, and a field coil inductively coupled with said armature, said frame having opposed ends, two of said magnets and the pole members connected thereto positioned adjacent one end of said frame, and the other two of said magnets and the pole member connected thereto positioned adjacent the other end of said frame.

12. A torque motor comprising four permanent magnets, each of said permanent magnets being magnetically connected at their north poles to pole members, and each at their south poles to pole members, said pole members being mounted and spaced from each other to form a pair of gaps, a frame having opposite sides, an armature having opposite faces positioned along said sides of said frame and extending exteriorly of the ends of said frame and into and between said gaps and one end of said armature positioned in one of said gaps and the other end of said armature positioned in the other of said gaps, means for mounting said armature in said frame and in said gaps for angular displacement of said armature in said gaps, said mounting including a torsional flexure constraint creating a positive angular restoring force on such angular displacement of said armature, and a field coil inductively coupled with said armature, said frame having opposed ends, two of said magnets and the pole members connected thereto positioned adjacent one end of said frame, and the other two of said magnets and the pole member connected thereto positioned adjacent the other end of said frame, the faces of said armature and said pole members forming four equal gaps.

13. A torque motor comprising two pairs of permanent magnets, each of the magnets of each of said pairs of magnets magnetically connected to a pole member at their north poles and to a pole member at their south poles, the south pole members being spaced from the north pole members to form a pair of gaps, a frame having opposite sides, an armature positioned along said sides of said frame and extending exteriorly of the ends of said frame and into and between said gaps, one end of said armature positioned in one of said gaps and the other end of said armature positioned in the other of said gaps, means for mounting said armature in said frame and in said gaps for angular displacement of said armature in said gaps, said mounting including a torsional flexure constraint, creating a positive angular restoring force on such angular displacement of said armature, and a field coil inductively coupled with said armature, said frame having opposed ends, one of said pairs of magnets positioned adjacent one end of said frame and the other of said pairs of magnets positioned adjacent the other end of said frame.

14. In the torque motor of claim 13, said torque motor including a magnetic connection between the said north pole members and a separate magnetic connection between the south pole members.

References Cited in the file of this patent

UNITED STATES PATENTS

| | | |
|---|---|---|
| 2,433,739 | Collins et al. | Dec. 30, 1947 |
| 2,718,614 | Gamble | Sept. 20, 1955 |